(12) United States Patent
Jain et al.

(10) Patent No.: US 10,904,148 B2
(45) Date of Patent: Jan. 26, 2021

(54) FLOW-BASED LOCAL EGRESS IN A MULTISITE DATACENTER

(71) Applicant: NICIRA, INC., Palo Alto, CA (US)

(72) Inventors: Jayant Jain, Cupertino, CA (US);
Anirban Sengupta, Saratoga, CA (US);
Minjal Agarwal, San Jose, CA (US);
Sami Boutros, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 10 days.

(21) Appl. No.: 15/918,898

(22) Filed: Mar. 12, 2018

(65) Prior Publication Data
US 2019/0280979 A1    Sep. 12, 2019

(51) Int. Cl.
| | |
|---|---|
| *H04L 12/801* | (2013.01) |
| *H04L 12/721* | (2013.01) |
| *H04L 12/54* | (2013.01) |
| *H04L 12/70* | (2013.01) |
| *G06F 9/455* | (2018.01) |

(52) U.S. Cl.
CPC .......... *H04L 47/12* (2013.01); *G06F 9/45558* (2013.01); *H04L 12/56* (2013.01); *H04L 45/66* (2013.01); *G06F 2009/45595* (2013.01); *H04L 2012/5618* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0067440 A1* | 3/2009 | Chadda | ............... | H04L 63/0227 370/401 |
| 2010/0107162 A1* | 4/2010 | Edwards | ............... | G06F 9/5077 718/1 |
| 2011/0299537 A1* | 12/2011 | Saraiya | ................. | H04L 69/324 370/392 |
| 2012/0008528 A1* | 1/2012 | Dunbar | ................. | H04L 12/462 370/255 |
| 2012/0014386 A1* | 1/2012 | Xiong | ............... | H04L 29/12028 370/392 |
| 2012/0144014 A1* | 6/2012 | Natham | .................. | H04L 45/66 709/224 |
| 2014/0269709 A1* | 9/2014 | Benny | ................. | H04L 61/2007 370/392 |

(Continued)

OTHER PUBLICATIONS

Local Egress updated Jun. 26, 2017 (2 pages).

*Primary Examiner* — Yee F Lam

(57) ABSTRACT

A method for a hypervisor to implement flow-based local egress in a multisite datacenter is disclosed. The method comprises: determining whether a first data packet of a first data flow has been received. If the first data packet has been received, then the hypervisor determines a MAC address of a first local gateway in a first site of a multisite datacenter that communicated the first data packet, and stores the MAC address of the first local gateway and a 5-tuple for the first data flow. Upon determining that a response for the first data flow has been received, the hypervisor determines whether the response includes the MAC address of the first local gateway. If the response includes a MAC address of another local gateway, then the hypervisor replaces, in the response, the MAC address of another local gateway with the MAC address of the first local gateway.

20 Claims, 8 Drawing Sheets

(56) References Cited

U.S. PATENT DOCUMENTS

| | | | |
|---|---|---|---|
| 2014/0376550 A1 | 12/2014 | Khan et al. | |
| 2015/0010002 A1* | 1/2015 | Duda | H04L 45/74 370/392 |
| 2015/0026345 A1* | 1/2015 | Ravinoothala | H04L 47/125 709/226 |
| 2015/0089032 A1* | 3/2015 | Agarwal | H04L 41/0816 709/221 |
| 2015/0169351 A1* | 6/2015 | Song | H04L 12/4641 718/1 |
| 2015/0263946 A1* | 9/2015 | Tubaltsev | H04L 45/586 370/392 |
| 2016/0359745 A1* | 12/2016 | Hao | H04L 12/46 |

\* cited by examiner

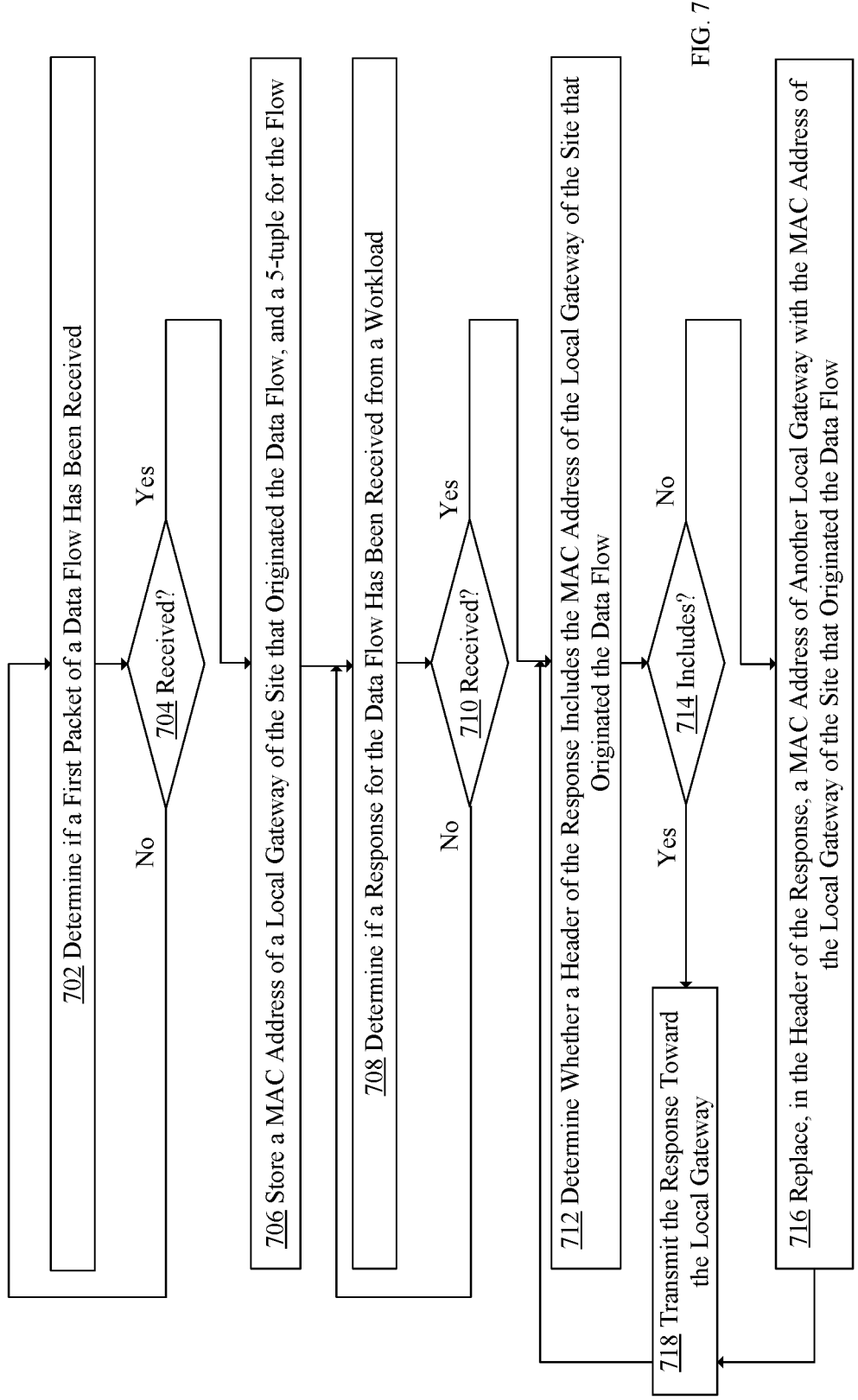

FLOW-BASED LOCAL EGRESS IN A MULTISITE DATACENTER

BACKGROUND

Computer-based, multisite datacenters have been gaining popularity due to their advanced scaling and disaster recovery functionalities. For example, the datacenters may be configured to deploy workloads across the multiple sites, and stretch multiple Layer 2 (L2) or Layer 3 (L3) connections across many sites. Furthermore, the datacenters may provide global server load balancing (GSLB) functionalities, network address translation (NAT), and routing infrastructures for migrating the workloads within the datacenters from one site to another.

In a multisite datacenter, after a workload migrates from one site to another, all data traffic generated by the migrated workload is typically directed to the original or affinitized datacenter egress edge. This is because the original/affinitized egress edge maintains the NAT bindings for the workload, and maintains the information necessary to determine a destination entity for the traffic. The original/affinitized edge may be configured to for example, implement the network address translation (NAT) services during the lifecycle of the workload.

Different techniques may be implemented in a multisite datacenter to direct data traffic from a migrated workload to an original/affinitized datacenter egress edge. However, most of the techniques may cause traffic tromboning.

Traffic tromboning occurs when data traffic traverses a datacenter interconnect link multiple times. The traffic tromboning may occur in a multisite datacenter that has a mixed routing and bridging network core, where a single L2 domain stretches across the network core, and/or where L3 forwarding is implemented by virtual machines. In such a datacenter, a data packet may traverse the core multiple times before reaching an original egress edge. The tromboning may cause undesirable bottlenecks, inefficiencies, and long latencies in data traffic ingressing and egressing the datacenter.

SUMMARY

Techniques are described herein for directing data traffic generated by workloads to original or affinitized datacenter egress edges in a way that does not cause traffic tromboning. The techniques are especially applicable to workloads that migrated from one site to another site, and where data traffic generated by the migrated workloads needs to be redirected to the original/affinitized datacenter egress edges, and not to the gateways in other sites. In an embodiment, only the traffic that was generated from an original site may be redirected to the affinitized edge, while the rest of the traffic may be forwarded by the edge in the current site. Therefore, as the workload moves around datacenters sites, the workload may have different data traffic going to different edges which are affinitized only to those flows.

Merely to explain simple examples, the site in which a data flow was originated and in which a workload was instantiated when the data flow was originated is referred to herein as a first site, whereas the site to which the workload migrated from the first site is referred to as a second site.

In an embodiment, an approach is implemented in components of a hypervisor, and is applicable to data traffic generated by a workload application in any of two situations: before the workload migrated from a first site where a data flow was originated, and after the workload migrated to a second site from the first site where the data flow was originated. In both situations, the approach allows directing the data flow's traffic generated by the workload to an egress edge in the first site and along a so-called old path. The old path may include the first site's local gateway that directed the original data traffic to the workload, and the first site's egress edge that directed the original traffic from an external entity to the local gateway. As long as the workload remains in the first site, data packets of the data flow generated by the workload may remain "unmodified" by the hypervisor.

However, if the workload migrates from the first site to the second site, then a stateful flow engine of a hypervisor may modify the workload's data packets of the flow that was originated in the first site. Specifically, the stateful flow engine may modify headers of such data packets to replace, in the headers, an address of a gateway of the second site with an address of the local gateway of the first site. That ensures that, after the workload migrated from the first site to the second site, the traffic from the workload follows the old path via the local gateway and the egress gateway of the first site.

For example, suppose that a data flow was originated in a first site of a multisite datacenter at the time when a workload application was already instantiated in the first site. However, during the lifecycle of the data flow, the workload migrated from the first site to a second site. Without the present approach, after the workload migrated to the second site, the workload's traffic of the flow would be directed to a local gateway in the second site even though the data flow was originated in the first site. Then, the traffic would be directed to the first site, then back to the second site, and so forth. This would cause the traffic tromboning.

According to the present approach, however, after the workload migrated from the first site to the second site, the workload's traffic of the flow is directed to a local gateway in the first site, and then to an edge in the first site. Therefore, the traffic tromboning is avoided.

In an embodiment, an approach includes modifying, when needed, contents of headers of data packets of data flows. Suppose that a data flow is originated in a first site when a workload application is instantiated in the first site. Suppose that a local gateway of the first site is used to route data traffic of the flow to, and from, the workload application. Suppose that the information about the data flow associated with the workload is stored in a stateful firewall implemented as part of a filter of a virtual network interface controller (vNIC), and is marked as belonging to the first site. Suppose that subsequently, the workload migrates from the first site to a second site, and the workload generates a response for the flow. However, before the workload can transmit the response to a destination, the workload generates and transmits an ARP request to determine a media access control (MAC) address of a local gateway that can forward the response of the flow to an egress edge.

In response to transmitting the ARP request, the workload receives an ARP response. The ARP response may include a MAC address of a local gateway in the second site because the workload is now executing in the second site. Therefore, after the workload migrated to the second site, the workload includes, in headers of data packets of the flow, the MAC address of the local gateway of the second site, not a MAC address of a local gateway of the first site.

But, according to the present approach, a stateful flow engine implemented in a hypervisor is configured to rewrite the headers of such data packets by replacing the MAC address of the second side's gateway with the MAC address of the first site's gateway.

Suppose that a MAC address of a local gateway in the first site is 01:01:01:01:01:0a, and a MAC address of a local gateway in the second site is 01:01:01:01:01:0b. Suppose that a data flow was originated in the first site when a workload application was instantiated in the first site. Suppose, that subsequently, the workload migrated from the first site to the second site. The workload generates and sends an ARP request, and receives an ARP response that includes the MAC address of the local gateway in the second site. Hence, the workload includes, in headers of the data packets of the data flow, the MAC address of 01:01:01:01:01:0b of the local gateway in the second site, not the MAC address of 01:01:01:01:01:0a of the local gateway in the first site. Therefore, after the workload migrates from the first site to the second site, the workload's data packets carry the MAC address of the second site's local gateway of 01:01:01:01:01:0b.

However, using the present approach, upon detecting such data packets sent by the workload, a stateful flow engine determines that the flow was originated in the first site even though the data packets carry the MAC address 01:01:01:01:01:0b of the second site's local gateway as a destination gateway. Therefore, the stateful flow engine rewrites the destination MAC address of the flow's data packets by replacing, in the header, the MAC address 01:01:01:01:01:0b of the second site's local gateway with the MAC address 01:01:01:01:01:0a of the first site's local gateway. For example, a migrated flow processing for workload 10.1.1.20 (01:02:03:04:05:06)→172.168.1.10, which may correspond to the second site's local gateway having the MAC address of 01:01:01:01:01:0b, may be rewritten to 10.1.1.20 (01:02:03:04:05:06)→172.168.1.10, which may correspond to the first site's local gateway having the MAC address of 01:01:01:01:01:0a.

In an embodiment, headers of the workload's data packets of a data flow that is originated in the second site after the workload migrated to the second site remain unmodified by a stateful flow engine. Such data packets are handled by a logical router and an edge router of the second site. But, if the workload migrates from the second site to for example, a third site, then the stateful flow engine may rewrite, in a header, a destination MAC address of the workload's data packets of the flow by replacing a MAC address of the third site's local gateway with a MAC address of the second site's local gateway.

The presented approach allows avoiding traffic tromboning in a multisite datacenter. It includes implementing header-rewriting mechanisms in a stateful flow engine while imposing no additional requirements on other components executing in the multisite datacenter. The approach allows directing a data flow from a workload to the local gateway and the egress edge of the site where the data flow was originated.

BRIEF DESCRIPTION OF THE DRAWINGS

In the drawings:

FIG. 7 depicts an example flow chart for implementing a flow-based local egress in a multisite datacenter.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

Figure 1A:
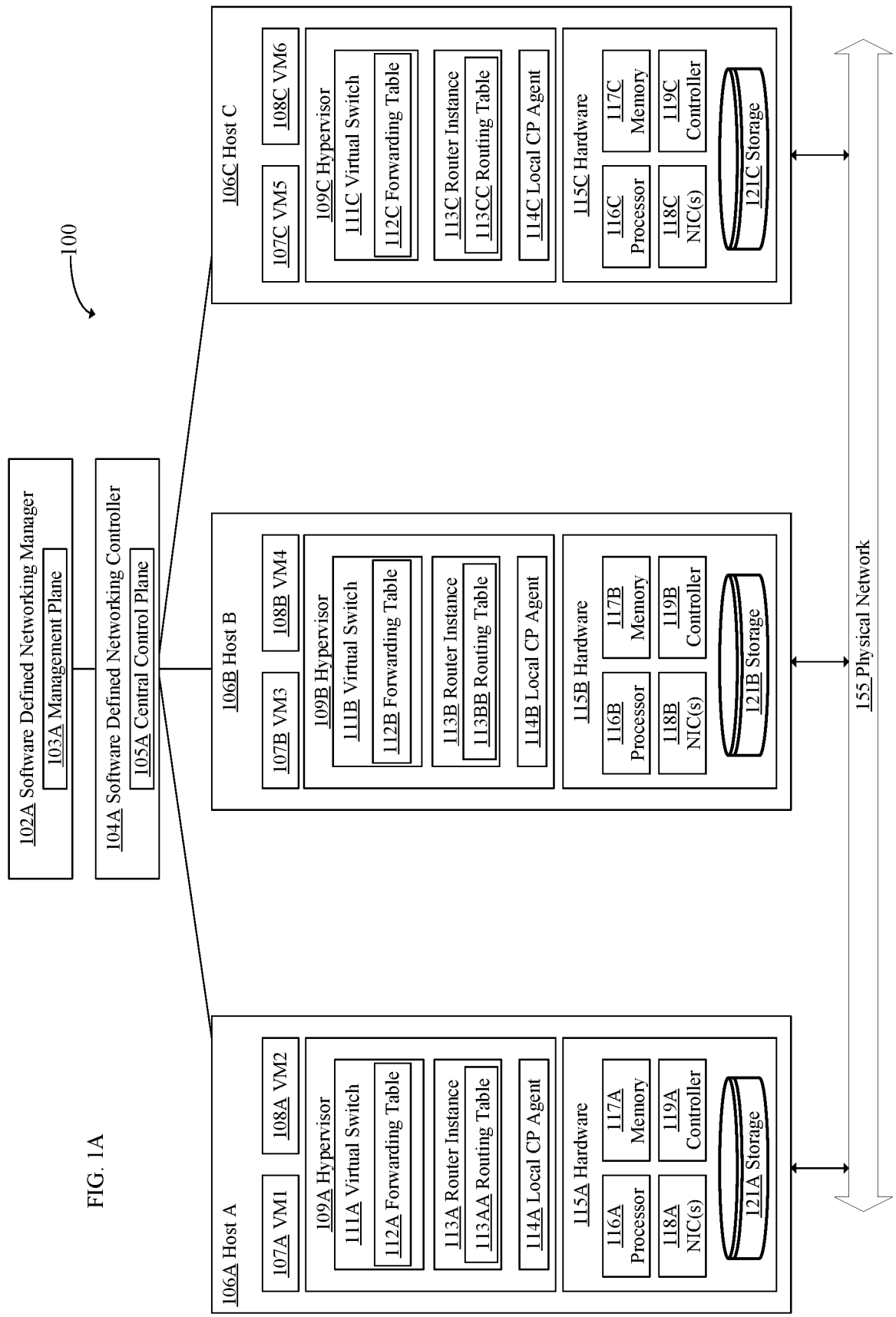
FIG. 1A is a block diagram depicting a physical implementation view of an example logical network environment of a multisite datacenter.

1. Example Physical Implementation View of an Example Logical Network Environment of a Multisite Datacenter FIG. 1A is a block diagram depicting a physical implementation view of an example logical network environment 100 of a multisite datacenter. In the depicted system, environment 100 includes a software defined networking (SDN) manager 102A, an SDN controller 104, one or more hosts 106A, 106B, 106C, and one or more physical networks 155.

SDN manager 102A may be configured to distribute various rules and policies to management plane agents, and receive update information from the agents. SDN manager 102A may use a management plane 103A to distribute and update the rules and policies. SDN manager 102A may also collect information about events, actions and tasks occurring or executed in hosts 106A, 106B, 106C, and use the collected information to update management plane 103A.

SDN manager 102A may configure logical switches, logical routers and logical networks in the multisite datacenter. For example, SDN manager 102A may be configured to collect and disseminate control information relating to the logical switches, logical routers, virtual machines, hosts and logical networks in system environment 100. The information may include network topology information, logical network membership information, protocol-to-hardware address (e.g., IP-to-MAC) mapping information of the virtual machines, virtual tunnel endpoints information, firewall rules, firewall policies, and so forth.

SDN controller 104A may be configured to receive rules and polices from SDN manager 102A, and control implementation of the rules and policies in hosts 106A, 106B, 106C. SDN controller 104A may use a central control plane 105A to control implementation of the rules and policies.

Hosts 106A, 106B, 106C are used to implement logical routers, logical switches and virtual machines executing in architecture 100 of a multisite datacenter. Hosts 106A, 106B, 106C are also referred to as computing devices, host computers, host devices, physical servers, server systems or physical machines. Each host may be configured to support several virtual machines. In the example depicted in FIG. 1A, host 106A is configured to support one or more virtual machines VM1 107A, and VM2 108A, hypervisor 109A, and hardware component 115A such as one or more processors 116A, one or more memory units 117A, one or more network interface controllers 118A, one or more controllers 119A, and storage 121A.

Host 106B may be configured to support one or more virtual machines VM3 107B, and VM4 108B, hypervisor 109B, and hardware component 115B such as one or more one or more controllers 119B, and storage 121B.

Host 106C may be configured to support one or more virtual machines VM5 107C, and VM6 108C, hypervisor 109C, and hardware component 115C such as one or more processors 116C, one or more memory units 117C, one or more network interface cards 118C, one or more controllers 119C, and storage 121C.

Hypervisors 109A/109B/109C may be configured to implement virtual switches 111A/111B/111C, respectively. Hypervisors 109A/109B/109C may also be configured to implement forwarding tables 112A/112B/112C, respectively. Furthermore, hypervisors 109A/109B/109C may be configured to implement distributed router instances 113A/113B/113C, respectively. Moreover, hypervisors 109A/109B/109C may be configured to implement local control plane agents 114A/114B/114C, respectively. It should be noted that although only a single forwarding table 112A/112B/112C is shown for each respective virtual switch, there could in fact be a set of forwarding tables for each virtual switch, and furthermore, there could be multiple virtual switches in each host.

Logical switches, also referred to as "overlay network switches" or "software defined switches" of a datacenter may be implemented in a distributed manner and can span multiple hosts 106A/106B/106C, and even multiple datacenters. For example, to connect VM1 and VM3 to a logical switch, entries (not shown) may be added to forwarding table 112A of logical switch of virtual switch 111A and to forwarding table 112B of logical switch of virtual switch 112B that adds VM1 107A and VM3 107B to the logical switch. Traffic passing between VM1 and VM3 via the logical switch are tunneled between host A 106A and host B 106B by tunnel endpoints, such as VXLAN or Geneve tunnel endpoints (not separately shown).

Distributed routers of a datacenter, also referred to as "distributed logical routers," "overlay network routers," or "software defined routers," may be implemented in a distributed manner, and can span multiple hosts 106A/106B/106C. For example, to connect a distributed router to VM1 107A, a distributed router instance may be instantiated on host 106A supporting VM1 107A. Distributed router instance 113A may implement a typical Layer 3 router functionality for traffic originating from VMs on host A 106A that are connected to a distributed router. Each distributed router instance may participate (along with other router instances on other hosts) in implementing multiple distributed routers for different guest VMs in accordance with a corresponding routing table 113AA/113BB/113CC. Although one routing table is shown for each router instance 113A, there may in fact be a set of routing tables for each routing instance.

Virtual machines VM1-VM6 are executed on hosts 106A, 106B, 106C, respectively, and are merely examples of virtualized computing instances or workloads. A virtualized computing instance may represent an addressable data compute node or isolated user space instance. In practice, any suitable technology may be used to provide isolated user space instances, not just hardware virtualization. Other virtualized computing instances may include containers executing on top of a host or guest operating system. Containers are namespaces that contain applications and are isolated from one another without the need for a hypervisor directly supporting the containers, or an operating system within each container. In contrast, virtual machines may be configured as complete computational environments containing virtual equivalents of the hardware and software components of a physical computing system.

Hypervisor 106A/106B/106C is a software layer or component that supports the execution of multiple virtualized computing instances. Hypervisors 106A, 106B, 106C may maintain mappings between underlying hardware 115A, 115B, 115C, respectively, and virtual resources allocated to the respective virtual machines. Virtual resources may be allocated to each virtual machine to support a guest operating system (OS) and executing of the applications.

Hardware 115A/115B/115C may include appropriate physical components, such as processors 116A/116B/116C, memory units 117A/117B/117C, network interface controllers 118A/118B/118C, physical network interface controllers 119A/119B/119C, and one or more storage devices 121A/121B/121C.

Figure 1B:
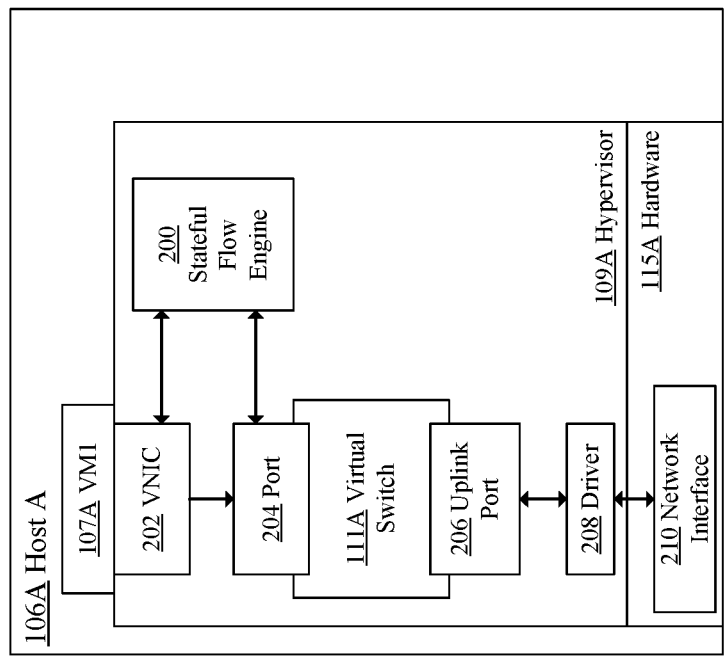
FIG. 1B is a block diagram depicting a physical implementation view showing a stateful flow engine implemented in a hypervisor.

FIG. 1B is a block diagram depicting a physical implementation view showing a stateful flow engine 200 implemented in a hypervisor 109A. Stateful flow engine 200 may be implemented in hypervisor 109A as for example, a stateful firewall component of hypervisor 109A. Stateful flow engine 200 may be configured to direct data traffic generated by workloads to original or affinitized datacenter egress edges in a way that does not cause traffic tromboning. For example, stateful flow engine 200 may direct the workloads that migrated from one site to another site, and where data traffic generated by the migrated workloads needs to be redirected to the original/affinitized datacenter egress edges, and not to the gateways in other sites.

In the example depicted in FIG. 1B, it is assumed that a data flow was originated in host A 106A. When a first data packet of the flow is detected by hypervisor 109A at for example, a vNIC 202, stateful flow engine 200 executed in hypervisor 109A extracts, from the source MAC address field in the incoming packet, a MAC address of a corresponding local gateway implemented in host A 106A, and stores it. Furthermore, stateful flow engine 200 stores a 5-tuple for the data flow. A 5-tuple may include a source IP address, a destination IP address, a source port, a destination port, and an identifier of a protocol used to communicate data packets of the data flow. Moreover, stateful flow engine 200 marks the flow as originated in site A 110A. The data packet is then transmitted via a port 204 to virtual switch 111A, and then via an uplink port 206 to a driver 208, and then to a network interface 210.

After the first data packet of the data flow reaches a workload, the workload generates a response. The details of generating the response are described in FIG. 2.

2. Example Datapath for a Data Flow

Figure 2:
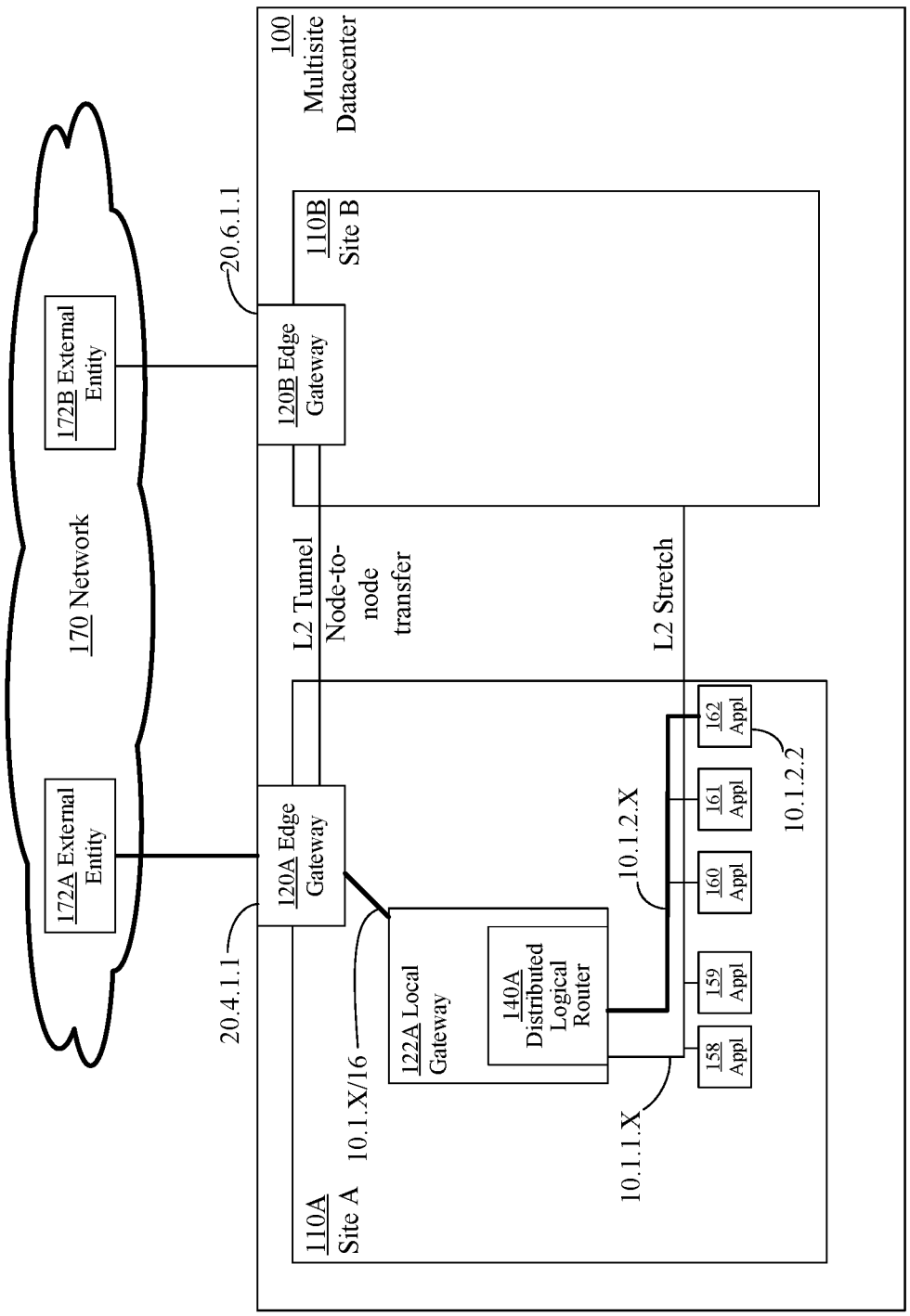
FIG. 2 is a block diagram depicting an example datapath for a data flow transmitted in a multisite datacenter before an example workload is migrated.

FIG. 2 is a block diagram depicting an example datapath for a data flow transmitted in a multisite datacenter before an example workload is migrated. The example diagram depicts a network 170 and an environment 100. Network 170 hosts one or more external entities 172A, 172B.

In the example depicted in FIG. 2, multisite datacenter 100 hosts two or more sites, including a site A 110A, and a site B 110B. Site A 110A communicates with external entity 172A via an edge gateway 120A, while site B 110B communicates with external entity 172B via an edge gateway 120B. Edge gateways are also referred to herein as egress edges. The egress edges communicate with each other via an L2 node-to-node communications connection.

Edge gateway 120A communicates with one or more local gateways 122A. A local gateway 122A uses a distributed logical router 140A to direct data flows to and from workloads 158, 159, 160, 161, 162, and so forth.

In the depicted example, edge gateway 120A is assigned a network address of 20.4.1.1, while edge gateway 120B is assigned a network address 20.6.1.1. Local gateway 122A receives data traffic directed to addresses 10.1.X/16. Distributed logical router 140A routes data traffic directed to 10.1.1.X and data traffic directed to 10.1.2.X. Example workload 162 uses a network address of 10.1.2.2. It should be noted that while example L3 addresses are given here in IPv4 format, it should be understood that the same principles would apply for IPv6, or other L3 addressing schemes.

Merely to describe simple examples, it is assumed that a data flow is originated by external entity 172A, and is transmitted between external entity 172A and application workload 162. When the data flow is generated in external entity 172A, and a first data packet of the flow is detected by a hypervisor in site A 110A, a stateful flow engine (shown in FIG. 1B) executed in the hypervisor stores a MAC address of a corresponding local gateway 122A implemented in site A 110A from the source MAC address field in the incoming packet. Furthermore, the stateful flow engine stores a 5-tuple for the data flow. A 5-tuple may include a source IP address, a destination IP address, a source port, a destination port, and an identifier of a protocol used to communicate data packets of the data flow. Moreover, the stateful flow engine marks the flow as originated in site A 110A.

After the first data packet of the data flow reaches workload 162, workload 162 determines a response. However, before workload 162 transmits the response, workload 162 may generate and broadcast an ARP request to determine a MAC address (if not already cached) of a local gateway to which the response is to be sent from the workload. In response to sending the ARP request, the workload receives an ARP response that includes the MAC address of local gateway 122A. Once workload 162 receives, in the ARP response, the MAC address of local gateway 122A, workload 162 includes the received MAC address in a header of the response packet, and transmits the response packet toward local gateway 122A. Then, local gateway 112A transmits the response packet to edge gateway 120A, which in turn transmits the response packet toward external entity 172A.

In this situation, the stateful flow engine did not modify the header of the response packet because the header included the same MAC address of the local gateway as the MAC address that the stateful flow engine stored for the data flow. Therefore, upon detecting the response packet and determining that the response packet belongs to the particular data flow, the stateful flow engine has no need to modify the header to change the MAC address of the local gateway included in the header. In fact, as long as workload 162 remains in site A 110A, data packets of the flow's traffic generated by workload 162 remain unmodified by the stateful flow engine. This may change, however, if or when workload 162 migrates to another site.

3. Example Datapath after Migrating a Workload

Figure 3:
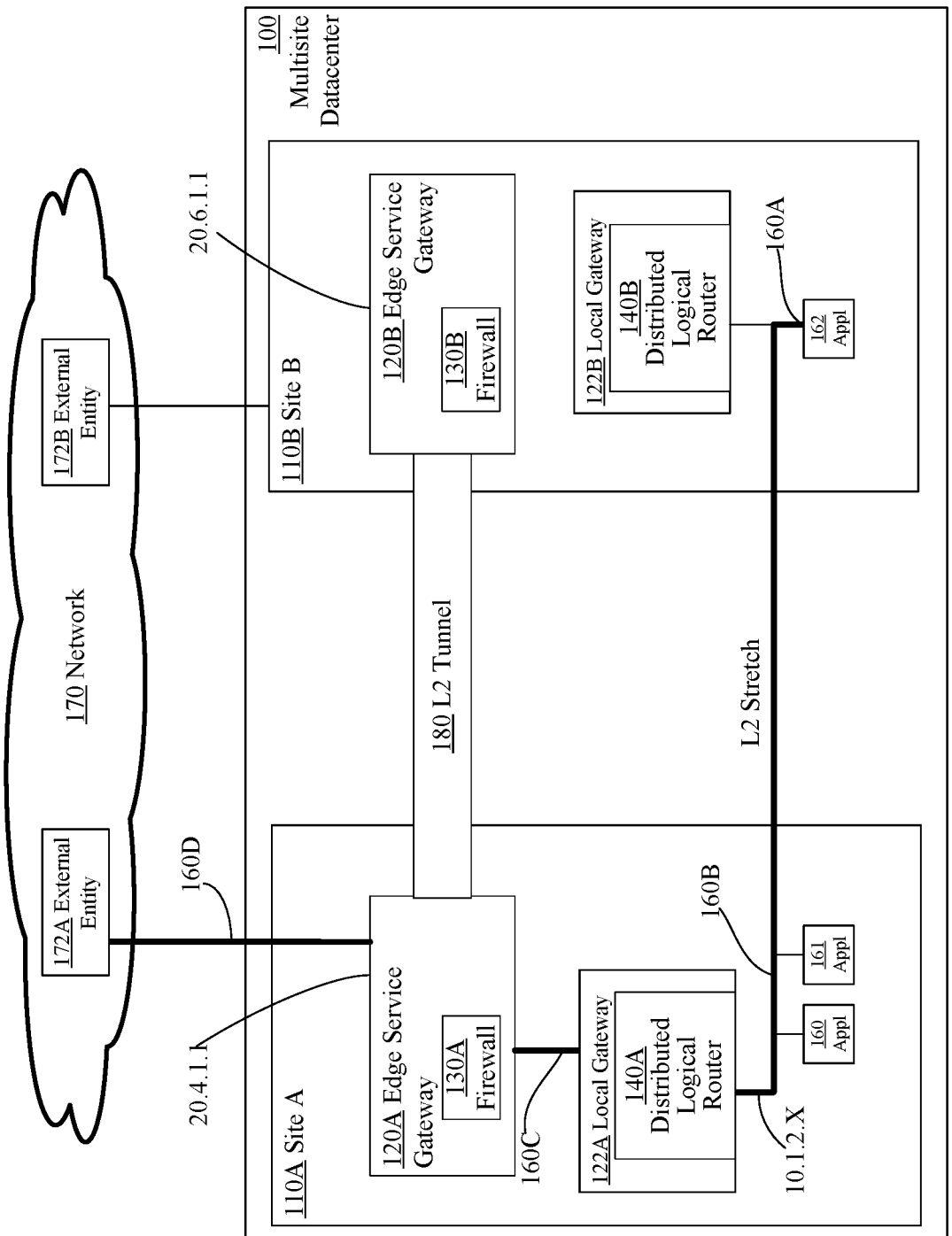
FIG. 3 is a block diagram depicting an example datapath for a data flow transmitted in a multisite datacenter after an example workload is migrated.

FIG. 3 is a block diagram depicting an example datapath for a data flow transmitted in a multisite datacenter after an example workload migrated. The example diagram depicts a network 170 and a multisite datacenter 100. Network 170 hosts one or more external entities 172A, 172B. Multisite datacenter 100 hosts two or more sites, including a site A 110A, and a site B 110B. Site A 110A communicates with external entity 172A via an edge gateway 120A, while site B 110B communicates with external entity 172B via an edge gateway 120B. Edge gateways communicate with each other via an L2 node-to-node communications connection.

Edge gateway 120A communicates with one or more local gateways 122A. Local gateway 122A uses a distributed logical router 140A to direct data flows to and from application workloads 160, 161, 162. Edge gateway 120B communicates with one or more local gateways 122B. Local gateway 122B uses a distributed logical router 140B to direct data flows to and from application 162, which migrated from site A 110A to site B 110B.

In the depicted example, edge gateway 120A is assigned a network address of 20.4.1.1, while edge gateway 120B is assigned a network address 20.6.1.1. Distributed logical router 140A routes data traffic directed to 10.1.2.X. Example workload 162 uses a network address of 10.1.2.2.

It is assumed herein that a data flow is originated by external entity 172A, and is transmitted between external entity 172A and workload 162. When a first data packet of the flow is detected by a hypervisor in site A 110A, a stateful flow engine executed in the hypervisor of site A 110A stores the per-flow information that includes a MAC address of a corresponding local gateway 122A implemented in site A 110A and a 5-tuple for the data flow. Moreover, the stateful flow engine marks the flow as originated in site A 110A.

After the first data packet of the data flow reaches workload 162, workload 162 determines a response. However, before workload 162 transmits the response, workload 162 generates and transmits an ARP request to determine a MAC address of a local gateway to which the response is to be sent from the workload. In response to sending the ARP request, the workload receives an ARP response. The ARP response may include the MAC address of local gateway 122B. Therefore, the ARP response may include the MAC address of local gateway 112B, not a MAC address of local gateway 112A.

Once workload 162 obtains, if not already cached, the MAC address of local gateway 122B, workload 162 includes the MAC address in a header of the response packet, and transmits the response packet toward local gateway 122B.

However, before the response data packet reaches local gateway 122B, a stateful flow engine executing in a hypervisor inspects a header of the response, and determines whether the packet includes a MAC address of local gateway 122A implemented in site A 110A because the stateful flow engine stored that MAC address for the data flow originated in site A 110A. If the stateful flow engine determines that the response packet includes the MAC address of local gateway implemented in site A 110A, then the stateful flow engine makes no modifications to the header of the response packet, and the response packet is transmitted toward local gateway 122A in site A 110A. In this case, however, the stateful flow engine will determine that the response packet includes a MAC address of local gateway 122B, not the MAC address of local gateway 122A implemented in site A 110A.

Therefore, the stateful flow engine may modify the header of the response packet by replacing, in the header, the MAC address of local gateway 122B with the MAC address of local gateway 122A, which corresponds to the MAC address that the stateful flow engine stored for the data flow. Therefore, upon detecting the response packet from workload 162 (which migrated from site A 110A to site B 110B), and determining that the response packet belongs to the data flow that was marked as originated in site A 110A, the stateful flow engine modifies the header to replace the MAC address of local gateway 122B with the MAC address of local gateway 122A.

Then, the response data packet may be transmitted via a link 160A and via an L2 stretch 160B to local gateway 122A, then via a link 160C to edge gateway 120A, and then via a link 160D to external entity 172A.

By replacing the gateway's MAC address in the header in such response packet, the traffic tromboning may be avoided. This way the data traffic reaches the site where the flow originated. Traffic tromboning refers to a traffic which unnecessarily goes back and between the sites.

4. Example Datapath for a Data Flow Originated after Migrating a Workload

Figure 4:
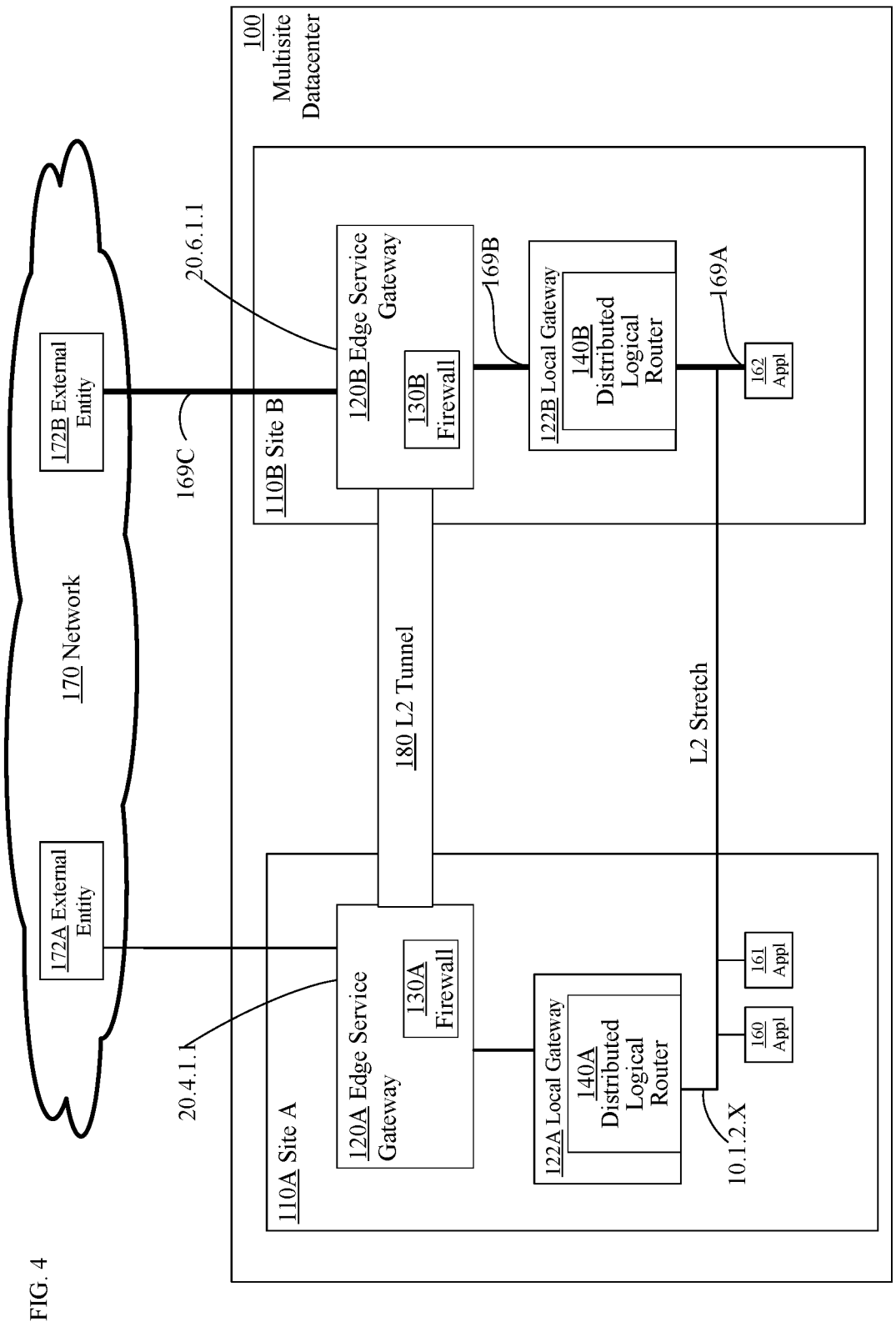
FIG. 4 is a block diagram depicting an example datapath for another data flow transmitted in a multisite datacenter after an example workload is migrated.

FIG. 4 is a block diagram depicting an example datapath for another data flow originated in a multisite datacenter after an example workload is migrated. The example diagram depicts a network 170 and a multisite datacenter 100. Network 170 hosts one or more external entities 172A, 172B.

Multisite datacenter 100 hosts two or more sites, including a site A 110A, and a site B 110B. Site A 110A communicates with external entity 172A via an edge gateway 120A, while site B 110B communicates with external entity 172B via an edge gateway 120B. Edge gateways communicate with each other via an L2 node-to-node communications connection.

Edge gateway 120A communicates with one or more local gateways 122A. Local gateway 122A uses a distributed logical router 140A to direct data flows to and from workloads 160, 161. Edge gateway 120B communicates with one or more local gateways 122B. Local gateway 122B uses a distributed logical router 140B to direct data flows to and from workload 162, which migrated from site A 110A to site B 110B.

In the depicted example, edge gateway 120A is assigned a network address of 20.4.1.1, while edge gateway 120B is assigned a network address 20.6.1.1. Distributed logical router 140A routes data traffic directed to 10.1.2.X, and workload 162 uses a network address of 10.1.2.2.

It is assumed that a data flow is originated by external entity 172B, and is transmitted between external entity 172B and workload 162. When a first data packet of the flow is detected by a hypervisor in site B 110B, a stateful flow engine executed in the hypervisor stores a MAC address of a corresponding local gateway 122B implemented in site B 110B. Furthermore, the stateful flow engine stores a 5-tuple for the data flow. Moreover, the stateful flow engine marks the flow as originated in site B 110B.

After the first data packet of the data flow reaches workload 162, workload 162 determines a response. However, before workload 162 transmits the response, workload 162 may generate and transmit an ARP request to determine a MAC address of a local gateway to which the response is to be sent from the workload. In response to sending the ARP request, the workload receives an ARP response. The ARP response may include the MAC address of local gateway 122B because local gateway 122B transmitted the data packets to workload 162.

Once workload 162 receives, in the ARP response, the MAC address of local gateway 122B, workload 162 includes the received MAC address in a header of the response packet, and transmits the response packet toward local gateway 122B via a communications link 169A.

Then, local gateway 122B transmits the response packet via a communications link 169B to edge gateway 120B, which in turn transmits the response packet via a communications link 169C toward external entity 172B.

In this situation, the stateful flow engine did not modify the header of the response packet because the header included the same MAC address of the local gateway as the MAC address that the stateful flow engine stored for the data flow. Therefore, upon detecting the response packet and determining that the response packet belongs to the data flow, the stateful flow engine has no need to modify the header. In fact, as long as workload 162 remains in site B 110B, data packets of the flow's traffic generated by workload 162 remain unmodified by the stateful flow engine. This may change, however, if or when workload 162 migrates to another site.

5. Example Routing Tables

Figure 5:
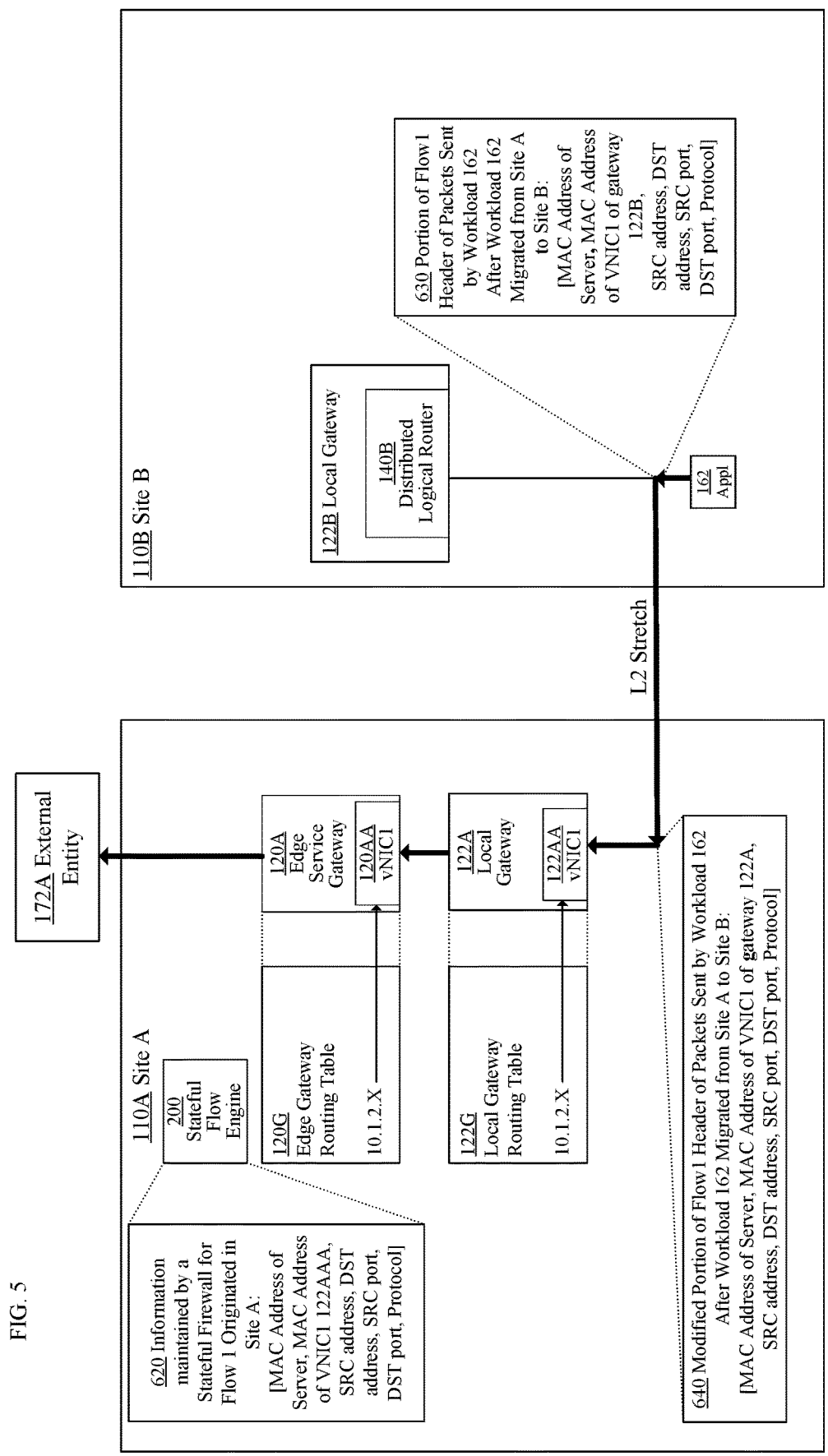
FIG. 5 depicts examples of routing tables, and examples of header data.

FIG. 5 depicts examples of routing tables, and examples of header data. Site A 110A, edge service gateway 120A, local gateway 122A, site B 110B, local gateway 122B and application 162 are described in detail in FIG. 2-4.

Example routing table 120G allows translating, at edge service gateway 120A, addresses of the incoming traffic, and directing the traffic to appropriate vNICs of edge service gateway 120A. In the depicted example, upon receiving traffic destined to 10.1.2.X, edge service gateway 120A may use routing table 120G to determine that the traffic is to be directed to vNIC1 120AA of edge service gateway 120AA.

Example routing table 122G allows translating, at local gateway 122A, addresses of the incoming traffic, and directing the traffic to appropriate vNICs of local gateway 122A. In the depicted example, upon receiving traffic destined to 10.1.2.X, local gateway 122A may use routing table 122G to determine that the traffic is to be directed to vNIC1 122AA of local gateway 122A.

Example data 620 depicts data maintained by a stateful firewall for a data flow that was originated in the site A. Example data 620 may include [MAC Address of Server, MAC Address of VNIC1 122AA, SRC address, DST address, SRC port, DST port, Protocol]. Notably, since the flow was originated in the site A, the stateful firewall stores the MAC address of the local gateway 122A for the flow, and marks the flow as originated in the site A.

Example data 630 depicts a portion of a header of packets sent by workload 162 after workload 162 migrated from the site A to the site B. Example data 630 may include [MAC Address of Server, MAC Address of VNIC1 of gateway 122B, SRC address, DST address, SRC port, DST port, Protocol]. Notably, since workload 162 migrated from the site A to the site B, and local gateway 122B is servicing workload 162 in the site B, the headers of the packets sent by workload 162 after workload 162 migrated to the site B will include the MAC address of local gateway 122B, not the MAC address of local gateway 122A.

Example data 640 depicts a portion of a header of packets after a stateful flow engine modified the header. Example data 640 may include [MAC Address of Server, MAC Address of VNIC1 122AA, SRC address, DST address, SRC port, DST port, Protocol]. Notably, since workload 162 migrated from the site A to the site B, but the stateful flow engine marked the flow as originated in the site A, the stateful flow engine replaced, in the header, the MAC address of local gateway 122B with the MAC address of local gateway 122A.

By replacing the MAC address in the header with the MAC address of local gateway 122A, the stateful flow engine ensured that the data packet may be transmitted to local gateway 122A, then to edge gateway 120A, and then to external entity 172A, and that the data packet will not be trombonned from one site to another.

Figure 6:
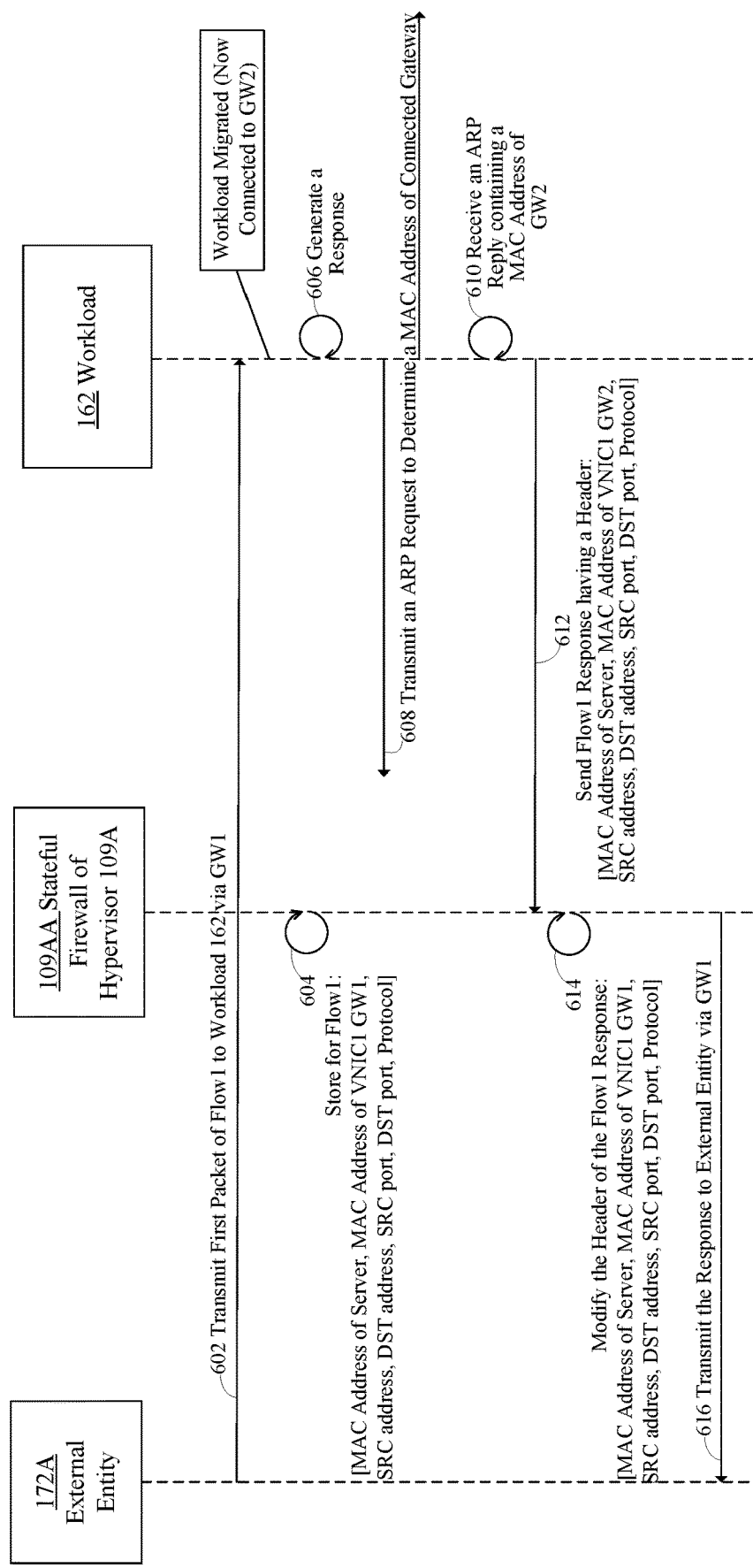
FIG. 6 depicts a time chart for implementing a flow-based local egress in a multisite datacenter.

6. Example Time Chart for Implementing a Flow-Based Local Egress in a Multisite Datacenter FIG. 6 depicts a time chart for implementing a flow-based local egress in a multisite datacenter. In FIG. 6, external entity 172A communicates with workload 162. Stateful firewall (or a stateful flow engine) 109AA is implemented in hypervisor 109A of a site A. External entity 172A, workload 162, and hypervisor 109A are described in detail in FIG. 1A.

In the following description, for the purposes of explanation, the term "site A" corresponds to a site of a multisite datacenter in which a workload was instantiated when a data flow to the workload was originated. The term "site B" corresponds to a site of the multisite datacenter to which the workload migrated from the site A. The terms "site A" and "site B" are used herein merely to illustrate clear examples, not to limit the disclosure in any way.

In the depicted example, external entity 172A attempts to communicate with workload 162 that is instantiated in the site A. External entity 172A transmits (602) a first data packet of the data flow toward workload 162. The first packet is detected by hypervisor 109A in the site A, and stateful firewall 109AA executed in hypervisor 109A stores (604) a MAC address of a local gateway 122A implemented in the site A. Furthermore, the stateful firewall stores a 5-tuple for the data flow. The 5-tuple includes a source address, a destination address, a source port, a destination port, and a protocol identifier for the data flow.

Suppose that after the first data packet reached workload 162, workload 162 migrated from the site A to the site B, and is now serviced by a local gateway 122B. Furthermore, suppose that workload 162 determines a response data packet.

Prior to transmitting the response data packet, workload 162 generates (606) and transmits (608) an ARP request to determine a MAC address of a local gateway to which the response is to be sent from workload 162. In response to sending the ARP request, workload 162 receives (610) an ARP response. The ARP response may include the MAC address of local gateway 122B.

Once workload 162 receives the MAC address in the ARP reply, workload 162 inserts the received MAC address to a header of the response data packet, and transmits (612) the response data packet toward local gateway 122B.

However, before the response data packet reaches local gateway 122B, stateful firewall 109AA executing in hypervisor 109A inspects the header of the response, and determines whether the packet includes a MAC address of local gateway 122A implemented in the site A where the data flow was originated. If stateful firewall 109AA determines that the response packet includes the MAC address of local gateway 122A implemented in the site A, then stateful firewall 109AA makes no modifications to the header, and the response packet is transmitted to local gateway 122A in the site A. This usually takes place when the data flow was originated in the site A when workload 161 was instantiated in the site A, and workload 162 has not migrated from the site A to any other site.

However, if stateful firewall 109AA determines that the response packet includes a MAC address other than the MAC address of local gateway 122A implemented in the site A, then stateful firewall 109AA replaces the MAC address included in the header with the MAC address of local gateway 122A in the site A. This usually takes place when, after the data flow was originated in the site A when workload 162 was instantiated in the site A, but then workload 162 migrated from the site A to for example, a site B. Therefore, after workload 162 migrated to the site B, and after workload 162 sent an ARP request to determine a current local gateway for the data flow, the workload may receive a MAC address of local gateway 122B in the site B, not the MAC address of local gateway 122A in the site A. Therefore, the workload's response packet may include the MAC address of the local gateway in the site B, not the local address of the local gateway in the site A.

Hence, if stateful firewall 109AA determines that the workload's response packet includes a gateway's MAC address other than the MAC address of local gateway 122A in the site A, then stateful firewall 109AA replaces (614), in the header of the response, the gateway's MAC address with the MAC address of local gateway 122A of the site A. Then, the response packet is directed toward local gateway 122A in the site A, and the response packet traverses the L2 tunnel toward local gateway 122A in the site A, and then egresses (616) the site A from a corresponding edge gateway in the site A.

7. Example Flow Chart for Implementing a Flow-Based Local Egress in a Multisite Datacenter FIG. 7 depicts an example flow chart for implementing a flow-based local egress in a multisite datacenter. In the following description, for the purposes of explanation, the term "site A" corresponds to a site of a multisite datacenter in which a workload was instantiated when a data flow to the workload was originated. The term "site B" corresponds to a site of the multisite datacenter to which the workload migrated.

The steps depicted in FIG. 7 are executed by a site A's hypervisor or its components. For example, the steps depicted in FIG. 7 may be executed by a stateful flow engine of the hypervisor executing in the site A.

In step 702, a stateful flow engine determines if a first data packet of a new data flow has been received. It is assumed herein that the new data flow is intended to a workload instantiated in the site A, and that the first data packet of the data flow was received when the workload remained in the site A.

If it is determined in step 704 that the first data packet of the data flow has been received, then step 706 is performed. Otherwise, step 702 is repeated.

In step 706, the stateful flow engine determines a MAC address of a local gateway of the site A that originated the data flow, and determines a 5-tuple for the data flow. Also in this step, the stateful flow engine stores the MAC address of the local gateway along with the 5-tuple flow information.

In step 708, the stateful flow engine determines whether a response for the data flow has been received from the workload.

If it is determined in step 710 that the response for the data flow has been received from the workload, then step 712 is received. Otherwise, step 708 is repeated.

In step 712, the stateful flow engine determines whether the response includes the MAC address of the local gateway of the site that originated the data flow. If the response includes the MAC address of the local gateway of the site that originated the data flow, then step 718 is performed. Otherwise, step 716 is performed.

In step 716, the stateful flow engine replaces, in the header of the response, a MAC address of another local gateway with the MAC address of the local gateway of the site A that originated the data flow.

In step 718, the response data packet traverses an L2 tunnel toward the local gateway of the site that originated the data flow. Then, the response egresses the site A from a corresponding edge gateway.

8. Improvements Provided by Certain Embodiments

The approach presented herein improves a process of directing data traffic from workloads to external entities by eliminating traffic tromboning, and thus by eliminating situations when the data traffic traverses a datacenter interconnect link multiple times. The presented approach allows eliminating the bottlenecks and inefficiencies that otherwise would have been caused by the traffic tromboning. This ensures that traffic follows the path of the previous packets for that flow so that stateful services such as NAT can be implemented at the various nodes, such as an edge and service routers, properly as they need to see both the ingress and egress packets for the same flow.

In an embodiment, an approach allows a stateful flow engine to identify whether data packets transmitted by a workload include a MAC address of the local gateway of the site in which the data flow was originated. If the data packets do not include the MAC address of that local gateway, then the stateful flow engine rewrites the headers of the data packets by replacing, in the headers, a gateway's MAC address with the MAC address of the local gateway of the site in which the data flow was originated. Hence, if the workload has migrated from a site A to a site B, then the stateful firewall may rewrite the headers of the packets of the data flow generated by the workload to include the MAC address of the local gateway in the site A. If the workload has not migrated from the site A, then the stateful firewall will not rewrite the headers of the data packets.

By implementing the replacing described above, the data packets are automatically forwarded to the site A's logical router over an L2 tunnel. Then the data packets are forwarded to an edge router of the site A, and then to a destination external entity.

In an embodiment, an approach allows avoiding traffic tromboning of the data flow by implementing additional functionalities in a stateful flow engine of a hypervisor. There is no need, however, to add any new functionalities to other components of the hypervisor or the datacenter such as the edge or service gateways.

9. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

10. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a hypervisor to implement flow-based local egress in a multisite datacenter, the method comprising:
   detecting a first data packet of a first data flow at a first site of a multisite datacenter;
   in response to detecting the first data packet of the first data flow at the first site of the multisite datacenter:
      classifying the first data flow as originating in the first site;
      determining a first media access control (MAC) address of a first local gateway in the first site; and
      storing the first MAC address of the first local gateway for the first data flow;
   determining that a response for the first data flow has been received;
   determining that a header of a packet of the response for the first data flow includes a second MAC address of a second local gateway in a second site of the multisite datacenter and not the first MAC address of the first local gateway from the first site in which the first data flow originated; and
   in response to determining that the header of the packet of the response does not include the first MAC address of the first local gateway from the first site in which the first data flow originated, replacing, in the header of the packet of the response, the second MAC address of the second local gateway with the first MAC address of the first local gateway.

2. The method of claim 1, wherein the response traverses a Layer 2 (L2) tunnel toward the first local gateway in the first site of the multisite datacenter, and then egresses the first site from a corresponding edge gateway in the first site.

3. The method of claim 1, further comprising: inspecting, by a stateful flow engine executing in the hypervisor, the header of packet of the response prior to the response reaching the second local gateway.

4. The method of claim 1, further comprising: generating, by the first flow, an address resolution protocol (ARP) request to determine a MAC address of a local gateway that can forward the response of the first flow to an egress edge;
   transmitting the ARP request;
   receiving a response to the ARP request, the response including the second MAC address of the second local gateway in the second site as a result of the first workflow being executed in the second site; and
   based on the received response to the ARP request, including, in the header of the packet of the response, the second MAC address of the second local gateway in the second site.

5. The method of claim 1, further comprising, in response to replacing the second MAC address of the second local gateway with the first MAC address of the first local gateway, transmitting the packet of the response to the first local gateway.

6. The method of claim 1, wherein the determining that the first data packet of the first data flow is received is performed by a stateful firewall of the hypervisor.

7. The method of claim 5, wherein the first local gateway is implemented as a logical router.

8. One or more non-transitory computer-readable storage media storing one or more computer instructions which, when executed by one or more processors, cause the one or more processors to perform:
   detecting a first data packet of a first data flow at a first site of a multisite datacenter;
   in response to detecting the first data packet of the first data flow at the first site of the multisite datacenter:
      classifying the first data flow as originating in the first site;
      determining a first media access control (MAC) address of a first local gateway in the first site; and
      storing the first MAC address of the first local gateway for the first data flow;
   determining that a response for the first data flow has been received;
   determining that a header of a packet of the response for the first data flow includes a second MAC address of a second local gateway in a second site of the multisite datacenter and not the first MAC address of the first local gateway from the first site in which the first data flow originated; and
   in response to determining that the header of the packet of the response does not include the first MAC address of the first local gateway from the first site in which the first data flow originated, replacing, in the header of the packet of the response, the second MAC address of the second local gateway with the first MAC address of the first local gateway.

9. The one or more non-transitory computer-readable storage media of claim 8, wherein the response traverses a Layer (L2) tunnel toward the first local gateway in the first site of the multisite datacenter, and then egresses the first site from a corresponding edge gateway in the first site.

10. The one or more non-transitory computer-readable storage media of claim 8, storing additional instructions which, when executed by the one or more processors, cause the one or more processors to perform:
    inspecting the header of packet of the response prior to the response reaching the second local gateway.

11. The one or more non-transitory computer-readable storage media of claim 8, storing additional instructions which, when executed by the one or more processors, cause the one or more processors to perform:
    in response to receiving the response to the first data flow, generating an address resolution protocol (ARP) request to determine a MAC address of a local gateway that can forward the response of the first flow to an egress edge;
    transmitting the ARP request;
    receiving a response to the ARP request, the response including the second MAC address of the second local gateway in the second site as a result of the first workflow being executed in the second site; and
    based on the received response to the ARP request, including, in the header of the packet of the response, the second MAC address of the second local gateway in the second site.

12. The one or more non-transitory computer-readable storage media of claim 8, storing additional instructions which, when executed by the one or more processors, cause the one or more processors to perform: in response to replacing the second MAC address of the second local gateway with the first MAC address of the first local gateway, transmitting the packet of the response to the first local gateway.

13. The one or more non-transitory computer-readable storage media of claim 8, wherein the determining that the first data packet of the first data flow is received is performed by a stateful firewall of a hypervisor.

14. The one or more non-transitory computer-readable storage media of claim 12, wherein the first local gateway is implemented as a logical router.

15. A system configured to implement flow-based local egress in a multisite datacenter, the system comprising:
one or more processors;
one or more memory units; and
one or more non-transitory computer-readable storage media storing one or more computer instructions which, when executed by the one or more processors, cause the one or more processors to perform:
detecting a first data packet of a first data flow at a first site of a multisite datacenter;
in response to detecting the first data packet of the first data flow at the first site of the multisite datacenter:
classifying the first data flow as originating in the first site;
determining a first media access control (MAC) address of a first local gateway in the first site; and
storing the first MAC address of the first local gateway for the first data flow;
determining that a response for the first data flow has been received;
determining that a header of a packet of the response for the first data flow includes a second MAC address of a second local gateway in a second site of the multisite datacenter and not the first MAC address of the first local gateway from the first site in which the first data flow originated; and
in response to determining that the header of the packet of the response does not include the first MAC address of the first local gateway from the first site in which the first data flow originated, replacing, in the header of the packet of the response, the second MAC address of the second local gateway with the first MAC address of the first local gateway.

16. The system of claim 15, wherein the response traverses a Layer 2 (L2) tunnel toward the first local gateway in the first site of the multisite datacenter, and then egresses the first site from a corresponding edge gateway in the first site.

17. The system of claim 15, wherein the one or more non-transitory computer-readable storage media store additional instructions which, when executed by the one or more processors, cause the one or more processors to perform: inspecting the header of packet of the response prior to the response reaching the second local gateway.

18. The system of claim 15, wherein the one or more non-transitory computer-readable storage media store additional instructions which, when executed by the one or more processors, cause the one or more processors to perform:
in response to receiving the response to the first data flow, generating an address resolution protocol (ARP) request to determine a MAC address of a local gateway that can forward the response of the first flow to an egress edge;
transmitting the ARP request;
receiving a response to the ARP request, the response including the second MAC address of the second local gateway in the second site as a result of the first workflow being executed in the second site; and
based on the received response to the ARP request, including, in the header of the packet of the response, the second MAC address of the second local gateway in the second site.

19. The system of claim 15, wherein the one or more non-transitory computer-readable storage media store additional instructions which, when executed by the one or more processors, cause the one or more processors to perform: in response to replacing the second MAC address of the second local gateway with the first MAC address of the first local gateway, transmitting the packet of the response to the first local gateway.

20. The system of claim 19, further comprising a host comprising a hypervisor, and wherein the determining that the first data packet of the first data flow is received is performed by a stateful firewall of the hypervisor.

* * * * *